(12) United States Patent
Wyatt et al.

(10) Patent No.: US 7,272,592 B2
(45) Date of Patent: Sep. 18, 2007

(54) UPDATING METADATA STORED IN A READ-ONLY MEDIA FILE

(75) Inventors: Stuart Alan Wyatt, Camano Island, WA (US); Michael Novak, Redmond, WA (US); Daniel Plastina, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 11/026,844

(22) Filed: Dec. 30, 2004

(65) Prior Publication Data

US 2006/0149704 A1    Jul. 6, 2006

(51) Int. Cl.
*G06F 7/00* (2006.01)
(52) U.S. Cl. .......................................... 707/2; 707/203
(58) Field of Classification Search .............. 707/1–10, 707/100, 101, 203
See application file for complete search history.

(56) References Cited

U.S. PATENT DOCUMENTS

| | | | |
|---|---|---|---|
| 5,428,732 A | 6/1995 | Hancock et al. | |
| 5,616,876 A | 4/1997 | Cluts | |
| 5,742,347 A | 4/1998 | Kandlur et al. | |
| 5,781,773 A * | 7/1998 | Vanderpool et al. | 707/100 |
| 5,870,553 A | 2/1999 | Shaw et al. | |
| 5,873,097 A * | 2/1999 | Harris et al. | 707/203 |
| 5,996,015 A | 11/1999 | Day et al. | |
| 6,201,540 B1 | 3/2001 | Gallup et al. | |
| 6,356,921 B1 | 3/2002 | Kumar et al. | |
| 6,484,156 B1 | 11/2002 | Gupta et al. | |
| 7,080,088 B1 * | 7/2006 | Lau | 707/101 |
| 2001/0001160 A1 | 5/2001 | Shoff et al. | |
| 2002/0001395 A1 | 1/2002 | Davis et al. | |
| 2002/0033844 A1 | 3/2002 | Levy et al. | |
| 2002/0069218 A1 | 6/2002 | Sull et al. | |
| 2002/0082730 A1 | 6/2002 | Capps et al. | |
| 2002/0099737 A1 | 7/2002 | Porter et al. | |
| 2002/0103920 A1 | 8/2002 | Berkun et al. | |
| 2002/0122137 A1 | 9/2002 | Chen et al. | |
| 2002/0143976 A1 | 10/2002 | Barker et al. | |
| 2002/0157095 A1 | 10/2002 | Masumitsu et al. | |
| 2002/0184180 A1 | 12/2002 | Debique et al. | |
| 2003/0009452 A1 | 1/2003 | O'Rourke et al. | |
| 2003/0023975 A1 | 1/2003 | Schrader et al. | |
| 2004/0006575 A1 | 1/2004 | Visharam et al. | |

(Continued)

OTHER PUBLICATIONS

Hu et al., "Multimedia Description Framework (MDF) for content description of Audio/Video Documents," Proceedings of the fourth ACM conference on Digital libraries, 1999, pp. 67-75, ACM Press, New York, U.S.A.

(Continued)

*Primary Examiner*—Wilson Lee
(74) *Attorney, Agent, or Firm*—Senniger Powers

(57) ABSTRACT

Storing metadata updates for a read-only media file. The media file has content and metadata describing the content. Responsive to a user or application program updating the metadata, the invention stores the updates to the metadata in an update data store when the media file is in the read-only state. The update data store is associated with the media file. The invention reconciles the metadata of the media file with the updates stored in the update data store to create updated metadata. The invention attempts to write the updated metadata to the media file when the media file is available with write access.

18 Claims, 7 Drawing Sheets

U.S. PATENT DOCUMENTS

| | | |
|---|---|---|
| 2004/0034870 A1* | 2/2004 | O'Brien et al. ............... 725/88 |
| 2004/0172593 A1 | 9/2004 | Wong et al. |
| 2004/0267693 A1 | 12/2004 | Lowe et al. |
| 2005/0234958 A1 | 10/2005 | Sipusic et al. |
| 2006/0021057 A1* | 1/2006 | Risan et al. ................... 726/26 |

OTHER PUBLICATIONS

Mueller, "Mediacaptain—an Interface for Browsing Streaming Media," Proceedings of the eighth ACM international conference on Multimedia, 2000, p. 419-421, ACM Press, New York, U.S.A.

Crossen et al., "Flytrap: Intelligent Group Music Recommendation," Proceedings of the 7th international conference on Intelligent user interfaces, 2002, pp. 184-185, ACM Press, New York, U.S.A.

Dunne et al., "mpME!: Music Recommendation and Exploration," Proceedings of the 7th international conference on Intelligent user interfaces, 2002, p. 235, ACM Press, New York, U.S.A.

Edward Swierk, et al., The Roma Personal Metadata Service, Mobile Networks and Applications vol. 7, pp. 407-418, 2002.

* cited by examiner

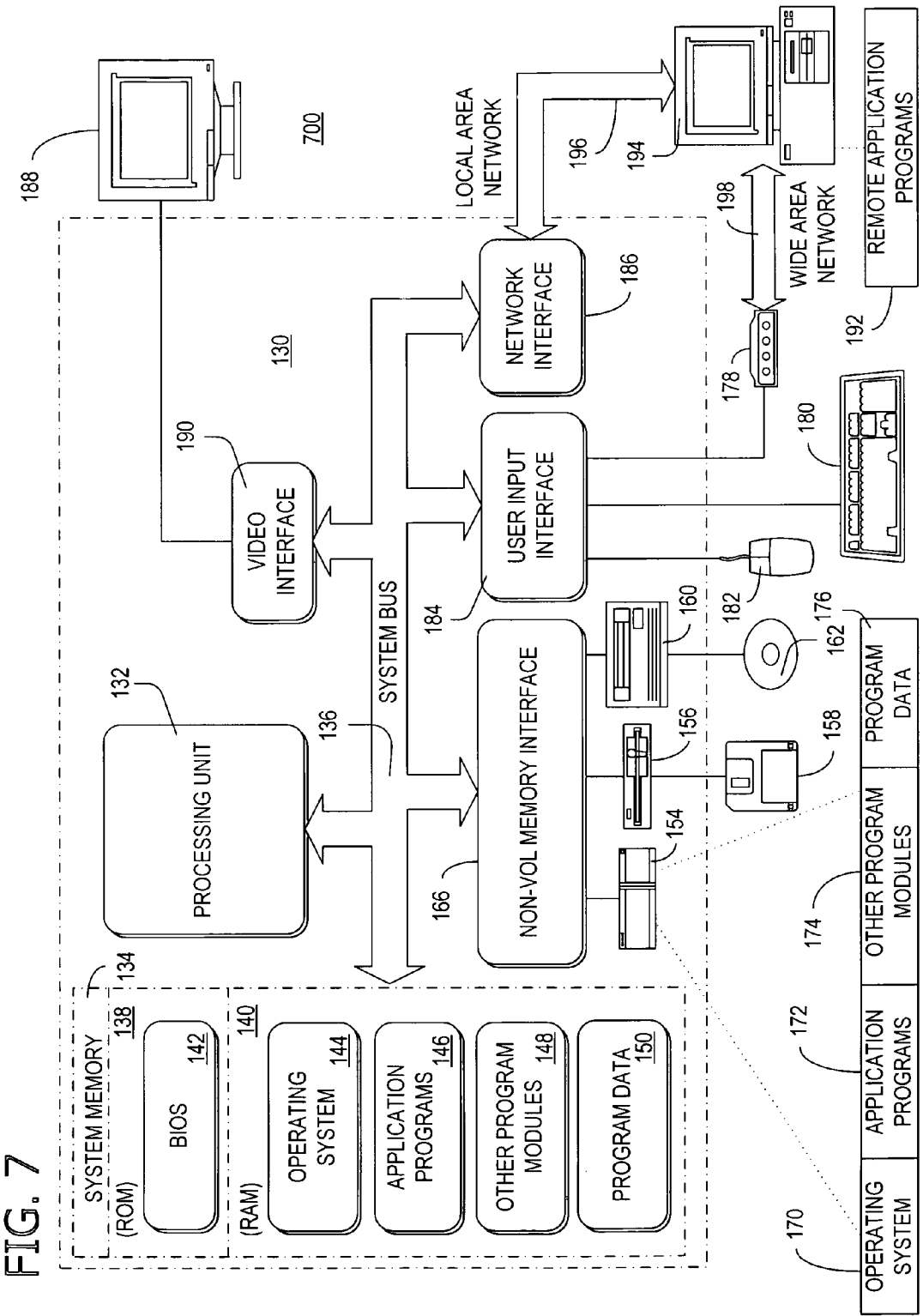

UPDATING METADATA STORED IN A READ-ONLY MEDIA FILE

TECHNICAL FIELD

Embodiments of the present invention relate to the field of media file metadata. In particular, embodiments of this invention relate to persisting changes to metadata associated with a read-only media file.

BACKGROUND OF THE INVENTION

In a media playback system, a media file is typically opened read-only, so that multiple users and applications may render or otherwise use the media file simultaneously. In a typical example, a user may want to rate a song during playback of the song. However, in a read-only state of the media file, media file updates such as changing the user rating metadata cannot be performed by the player or any other application with current systems. Since some files can take hours to play, having the file held exclusively in read-only mode can be problematic. Even if the files are shared in such a way to allow write operations, perceived and real file corruptions could result. For example, if the media file is modified by another application during playback, the file will change "underneath" the playback application and, thus, the changes may nullify other changes or even corrupt the media file.

Accordingly, a system for persisting changes to metadata associated with a read-only media file is desired to address one or more of these and other disadvantages.

SUMMARY OF THE INVENTION

Embodiments of the invention enable metadata changes to a file to be made and persisted while a file (or the metadata itself) is opened read-only. The invention further enables users and applications to use media files for simultaneous playback and metadata editing. In one embodiment, metadata changes are written to a metadata cache if the media file is in a read-only state. Changes to the file metadata are available to other applications using the media file. Later, when the media file is reopened, the metadata cache is merged into or reconciled with the media file metadata for use during that session. At that time, if the media file is writeable, the reconciled metadata is written to the media file and the metadata cache is deleted. This update of the media file metadata is also attempted when the media file is closed by a user or application program. With the invention, the potential for lost metadata changes due to lazy writes will be minimized. Even if an application which is unaware of the metadata cache modifies the main file metadata, the cache can still be merged into or reconciled with the main file later.

In accordance with one aspect of the invention, a computer-implemented method updates metadata associated with a media file. The media file has at least a read-only state and a writeable state. The computer-implemented method includes opening a media file having content and metadata describing the content. The computer-implemented method further includes storing one or more updates to the metadata in an update data store when the media file is in the read-only state. The update data store is associated with the media file. The computer-implemented method further includes reconciling the metadata of the media file with the updates stored in the update data store to create updated metadata. The computer-implemented method further includes storing the updated metadata in the media file when the media file is in the writeable state.

In accordance with another aspect of the invention, one or more computer-readable media having computer-executable components for updating metadata stored within a media file. The media file further stores content. The metadata describes the content. The media file has at least a read-only state and a writeable state. The components include a data stream module, a processor module, and a media module. The data stream module stores, in a memory area, one or more updates to metadata when the media file is in the read-only state. The memory area is associated with the media file. The processor module creates updated metadata by reconciling the metadata of the media file with the updates stored in the memory area. The media module stores the updated metadata in the media file when the media file is in the writeable state.

In accordance with yet another aspect of the invention, a system updates metadata associated with a media file. The media file has at least a read-only state and a writeable state. The system includes a memory area and a processor. The memory area stores a media file having content and metadata describing the content. The memory area further stores updates to the metadata in an update portion. The update portion of the memory area is associated with the media file stored in the memory area. The processor is configured to execute computer-executable instructions for storing updates to the metadata in the update portion of the memory area when the media file is in the read-only state, reconciling the metadata of the media file with the updates stored in the update portion to create updated metadata, and storing the updated metadata in the media file when the media file is in the writeable state.

Alternatively, the invention may comprise various other methods and apparatuses.

Other features will be in part apparent and in part pointed out hereinafter.

BRIEF DESCRIPTION OF THE DRAWINGS

FIG. 7 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
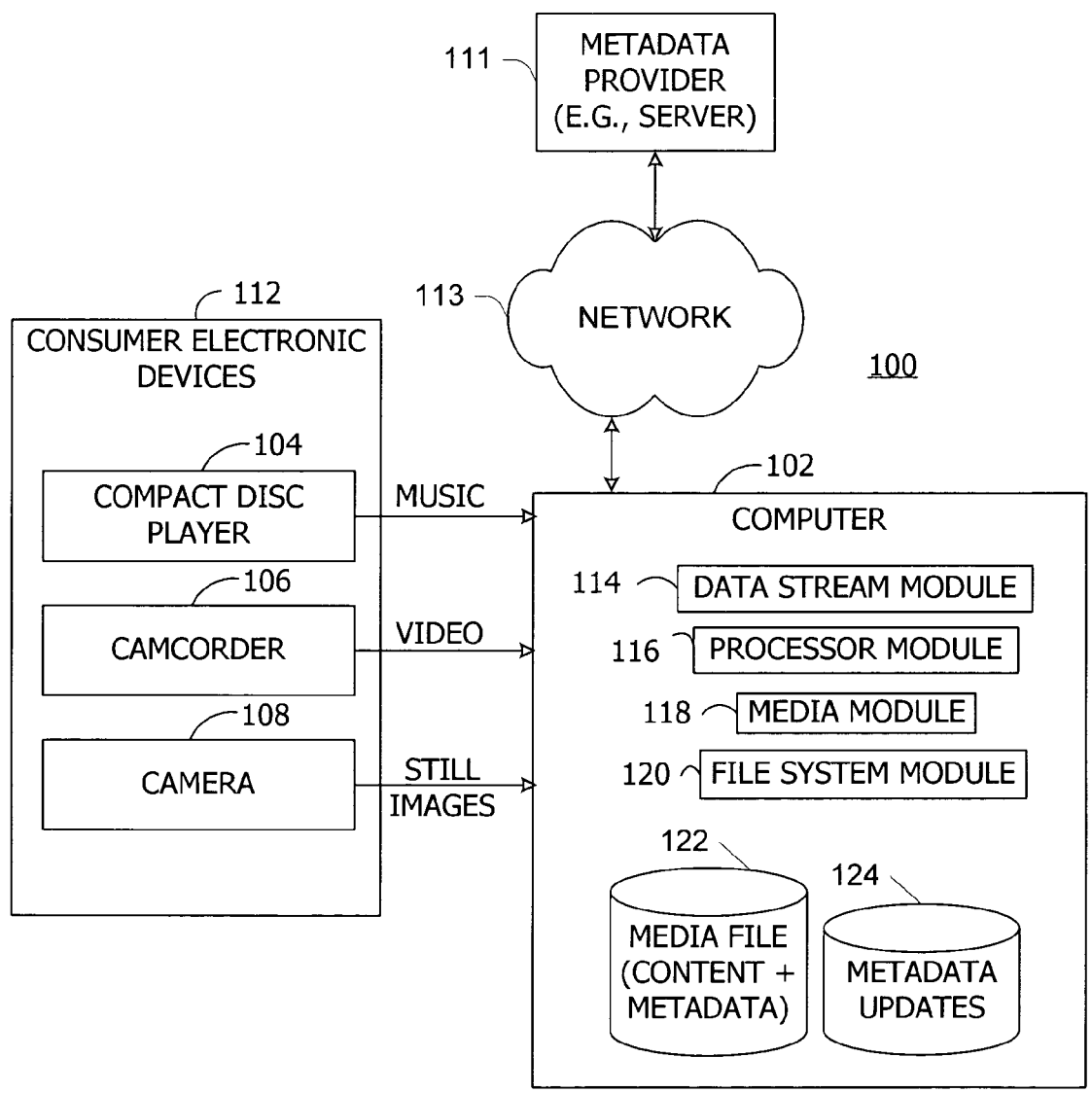
FIG. 1 is a block diagram illustrating an exemplary media environment in which the invention may be implemented.

Referring first to FIG. 1, a block diagram illustrates an exemplary media environment in which the invention may be implemented. A system 100 has one or more computers 102 coupled to one or more consumer electronic devices 112 providing media content including audio data, video data, and/or still image data. For example, the devices 112 may include a compact disc (CD) player 104, a camcorder 106, or a camera 108. Additionally, the devices 112 may include other personal computers, removable hard drives, network shares, a Moving Picture Experts Group audio layer-3 (MP3) player, an audio system in an automobile, a personal digital assistant, a cellular telephone, or the like. The consumer electronic devices 112 may include any suitable rendering filter or media player or device that is configured to render digital media so that the user can experience the content that is embodied on the consumer electronic device 112. For example, suitable media player applications include a compact disc (CD) media player and a digital versatile disc or digital video disc (DVD) media player. The computer 102 also has rendering capability including a processor and rendering software (e.g., a media player).

In an embodiment, the invention enables a user to edit metadata associated with a media file when the media file is read-only or when the metadata is read-only (e.g., the content in the media file may be writeable, but the metadata is read-only). In particular, the invention improves latent write systems by storing the edits or updates to the metadata when the file is in a read-only state and attempting to write the edits or updates to the media file when the media file becomes writeable. For example, a change to the metadata may occur on a portable consumer electronic device, such as device 112, and that metadata will eventually be carried forth to the media file stored on a personal computer.

The computer 102 may have access to one or more computer-readable media (e.g., memory area 122 and memory area 124). While the memory areas 122, 124 are illustrated to be part of the computer 102 in FIG. 1, the memory areas 122, 124 may be separate from the computer 102 yet accessible to the computer 102, for example, via a network. Further, the memory areas 122, 124 may be a single memory area with portions dedicated, for example, to content, metadata, and updated metadata.

One aspect of the present invention enables the user or, particularly, enables a media player program executing on computing device 112 or client, to access, retrieve, and display for the user, so-called metadata. Those skilled in the art are familiar with metadata, which is simply information about data. In the context of the illustrated embodiment, metadata includes information related to specific content of a digital media file being played on the media player. Basic metadata includes, but is not limited to, title, performer, genre, track number, and the like. Extended metadata includes, but is not limited to, cover art, composer, description of content, performer biographies, reviews, ratings, related performers, where to buy similar items, upcoming concerts, ticket sales, URLs to other related experiences including purchase opportunities, studio, director, and the like. In one embodiment, extended metadata may be organized into two main categories: metadata retrieved or downloaded, and metadata computed from the media file (e.g., digital signal processing of the file stream). The metadata may be stored within the media file or stored in another file accessible and known to the media file.

The computer 102 also has one or more exemplary modules or components for implementing the invention. For example, the computer 102 may have a data stream module 114, a processor module 116, a media module 118, and a file system module 120. The data stream module 114 stores, in a memory area, updates to metadata when the media file is in the read-only state. The memory area in this instance is associated with the media file. The processor module 116 creates updated metadata by reconciling the metadata of the media file with the updates stored in the memory area. The media module 118 stores the updated metadata in the media file when the media file is in the writeable state. The file system module 120 opens the media file into the read-only state. The file system module 120 further closes the media file, re-opens the media file into the writeable state, and stores the reconciled metadata in the re-opened media file.

Those skilled in the art will note that the invention software may be implemented with any number and organization of components or modules. That is, the invention is not limited to the specific configuration of modules 114, 116, 118, and 120, but may include more or less components having more or less individual functionality than described herein.

In one example, additional metadata is available from the metadata provider 111 via a data communication network 113. The computer 102 and metadata provider 111 are coupled to the data communication network 113. While the network 113 includes the Internet in one example, the teachings of the invention may be applied to any data communication network. Data communication network 113 may support, for example, client/server communications or peer-to-peer connections.

In the examples herein, the media content of the digital media file is described in the context of content embodied on a CD or a DVD. It is to be appreciated and understood that the media content may be embodied on any suitable media and that the specific examples described herein are given to further understanding of the inventive principles. For convenience, a digital media file refers to one or more files representing, for example, a single song track or a collection of tracks such as would be found on an audio CD. The media content may include, without limitation, specially encoded media content (e.g., audio, video, or still images) in the form of an encoded media file.

Figure 2:
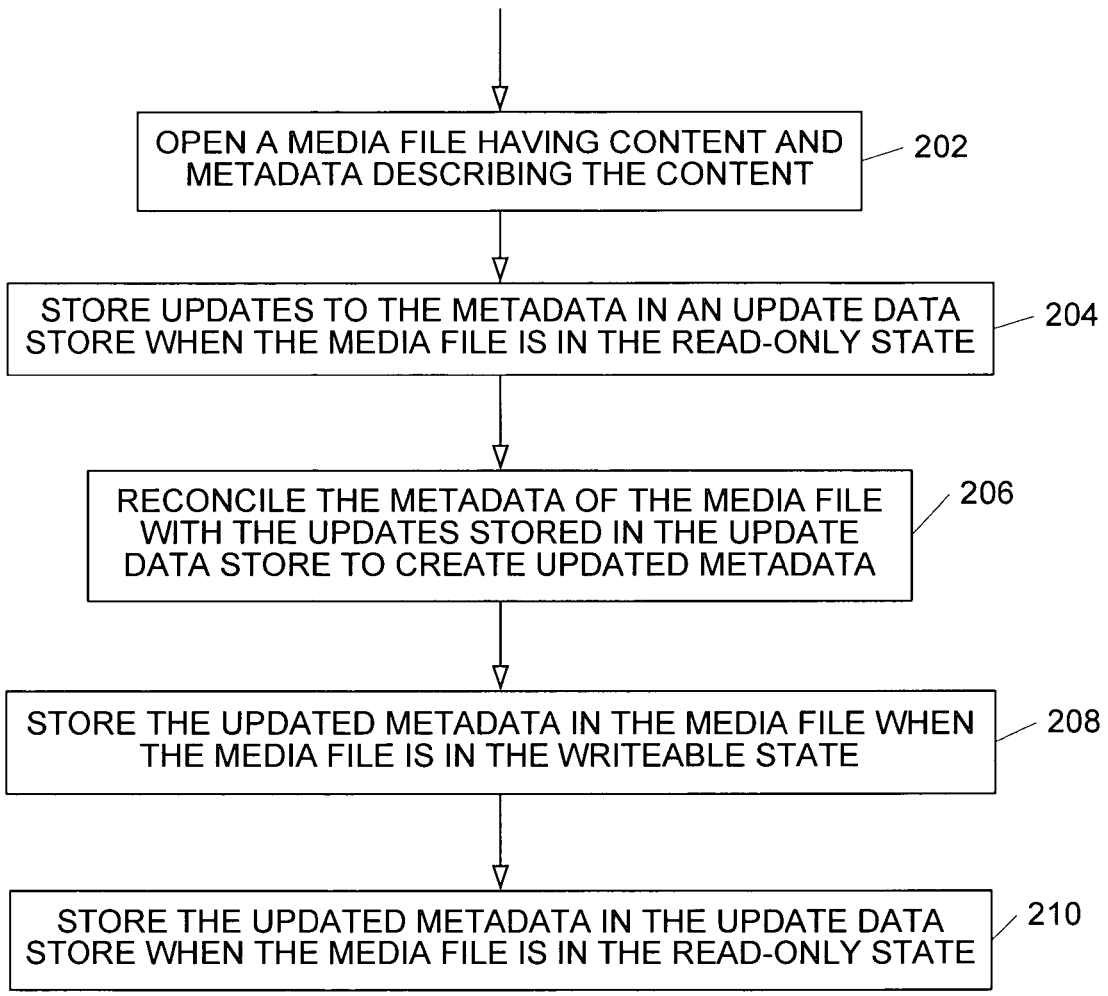
FIG. 2 is an exemplary flow chart illustrating an embodiment of the invention.

Referring next to FIG. 2, an exemplary flow chart illustrates operation of one embodiment of the invention. The flow chart in FIG. 2 applies, for example, to a scenario in which a user renders content stored in a media file and rates the content while the content is being rendered. The media file is defined to include the content and metadata associated with the content. At 202, the invention opens the media file (e.g., as a main data stream in a file system such as NTFS) having content and metadata describing the content. The invention stores updates to the metadata in an update data store (e.g., an alternate data stream in NTFS, or a metadata cache) at 204 when the media file is in a read-only state (or when the metadata portion of the media file is in a read-only state). The media file has at least the following states: read-only and read-write (e.g., writeable). The states may apply only to a portion or region of the media file. For example, the metadata portion may be locked or read-only while a content portion is read-write, or vice versa. In one example, the media file may be marked read-only, be located on a read-only share, or be forced to open in a read-only mode (e.g., because the media file is in use by another application program). The update data store is associated with the media file, and is capable of being in any state independent of the media file (or the metadata portion of the media file). The invention further reconciles the metadata of the media file with the updates stored in the update data store to create updated metadata at 206. If the media file is in the read-write state, the invention stores the updated metadata in the media file at 208 and deletes the update data store. If the media file is in the read-only state, the invention stores the updated metadata in the update data store at 210. In one embodiment, the data written to the update data store includes a header followed by a serialized property store including the metadata updates. In one embodiment, the header contains a sixteen-byte signature and an eight-byte data size value.

In general, one or more computer-readable media have computer-executable instructions for performing the computer-implemented method illustrated in FIGS. 2-6.

In one embodiment, an alternate data stream for a file system (e.g., NTFS) is used to hold the updates to the metadata. The alternate data stream or other similar data store is "tied" or otherwise associated with the main data stream. Because the alternate stream is associated with the main data stream, the data in the metadata cache is copied along with the data in the main data stream when the media file is copied (e.g., to a partition in a file system that supports the alternate data stream). This provides protection from loss of data. If the file is copied to a partition in a file system that does not support or recognize the alternate data stream), the data in the alternate data stream will be lost. However, this only results in the loss of the metadata in the metadata cache. The metadata stored in the media file remains intact. In addition, the media file does not become corrupt from the loss of the alternate data stream.

Alternatively or in addition, a token may serve as a link from the main data stream to a memory area storing the updated metadata. In general, the invention is operable with any form of associated, linked, persistent storage containing the updated metadata. Further, corruption of the linked persistent storage or severing the linked persistent storage from the main media file does not affect the main media file or main data stream. In addition, locking the main data stream occurs independent of locking the alternate data stream.

Figure 3:
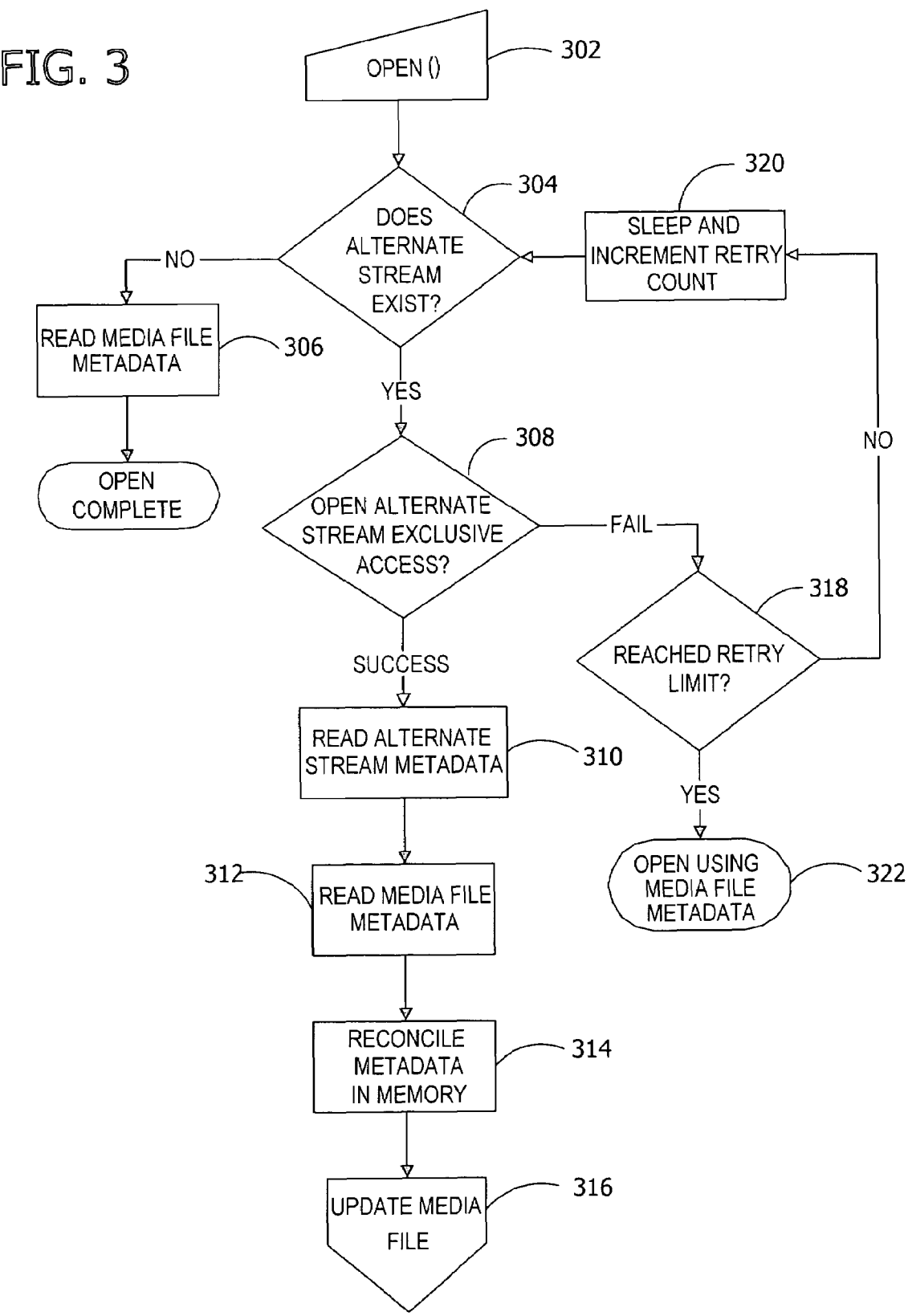
FIG. 3 is an exemplary flow chart illustrating metadata reconciliation in a media file open operation.

Referring next to FIG. 3, an exemplary flow chart illustrates metadata reconciliation in a media file open operation. A user or application program calls or invokes an open( ) operation at 302. The invention determines whether an alternate data stream exists at 304. If the alternate data stream does not exist at 304, the invention reads metadata from the main media file at 306 and the open operation completes. If the alternate data stream exists at 304, the invention attempts to open the alternate data stream with exclusive access (e.g., locking the alternate data stream from changes by a third party). If the invention is unable to open the alternate stream with exclusive access at 308, the invention determines if a retry limit has been reached at 318. If the invention has attempted to open the alternate stream with exclusive access a particular number of times exceeding some predetermined number of times, the invention reads the media file metadata at 322. If the retry limit has not been reached, the invention increments the retry counter at 320 and repeats elements 304 and 306 after a period of time (e.g., sleep).

If the invention is able to open the alternate stream with exclusive access at 308, the invention reads the alternate stream metadata at 310 and the media file metadata at 312. The invention reconciles the metadata read from the alternate stream and the metadata read from the media file at 314. After reconciling the metadata in memory at 314, the invention attempts to update the media file at 316 with the reconciled metadata.

Reconciliation may occur on the basis of one or more factors known in the art. Exemplary factors include a timestamp, a cyclic redundancy check (CRC), and a policy favoring the media file metadata or the metadata updates. For example, each item of metadata may have a timestamp associated therewith for comparison with a timestamp associated with a corresponding metadata item stored in another memory area. In another embodiment, the invention maps the metadata stored in the media file to a first value and stores the first value in the update data store when the media file is opened (e.g., by a media player). When attempting to merge or otherwise create the updated metadata, the invention maps the metadata stored in the media file to a second value and compares the first value with the second value. The invention then stores the updated metadata in the media file as a function of the compared first value and second value. For example, the invention computes and stores a hash of the media file in the alternate file and then later computes a CRC value of the media file during reconciliation for comparison with the value stored in the alternate file. If a third party has modified the media file metadata, the CRC value stored in the alternate file will differ from the computed CRC value and the invention concludes that the alternate file is possibly storing stale or old metadata. If the CRC value stored in the alternative file is equal to the computed CRC value, the invention determines that the alternate file stores the most recent metadata. In general, metadata reconciliation may occur at any time (e.g., at the request of the user or otherwise or upon completion of playback).

Figure 4:
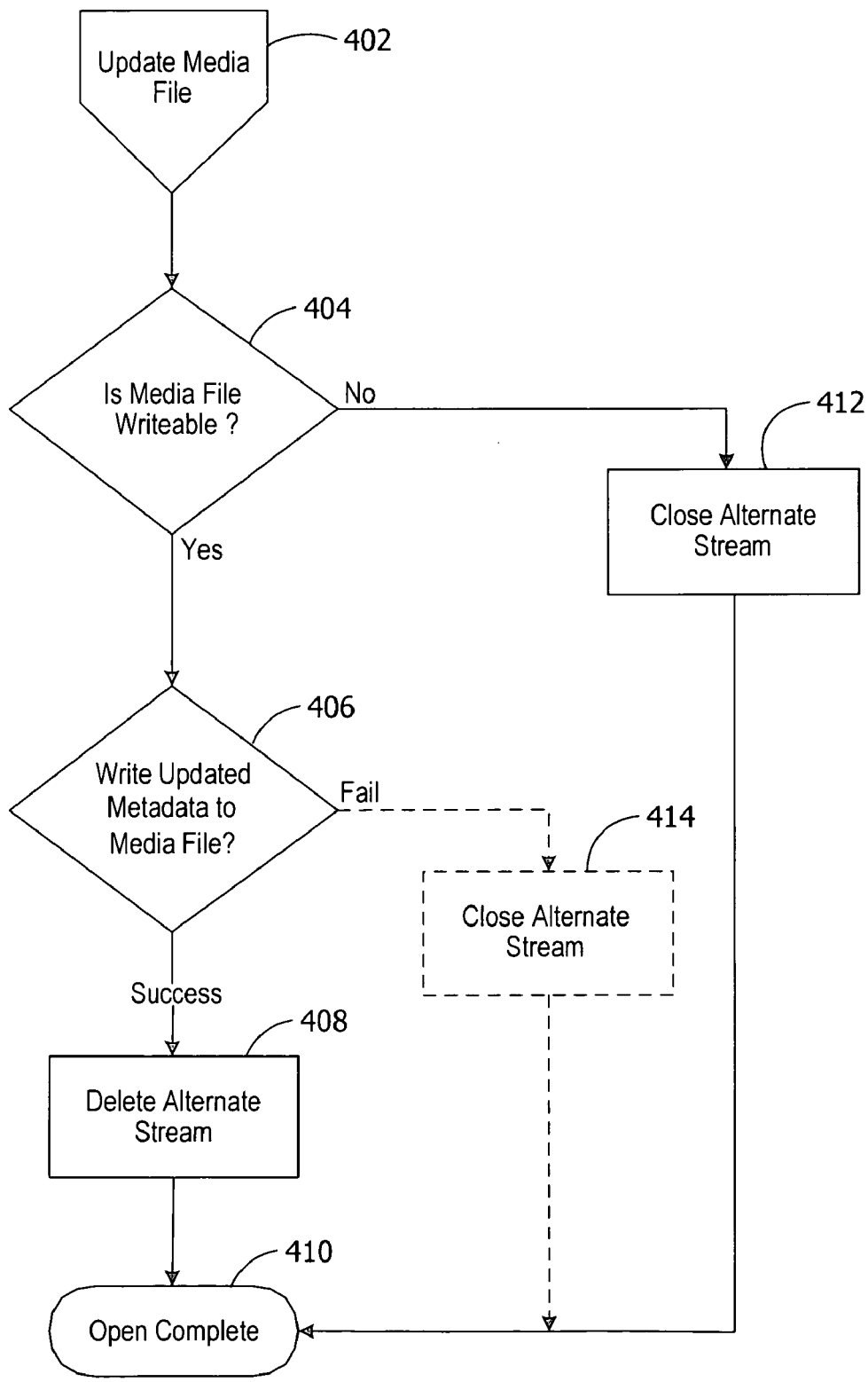
FIG. 4 is an exemplary flow chart illustrating a metadata flush attempt during a media file open operation.

Referring next to FIG. 4, an exemplary flow chart illustrates a metadata flush attempt during a media file open operation. While the update media file routine 316 in FIG. 3 may correspond to the update media file routine 402 in FIG. 4 in one embodiment, the functionality illustrated in FIG. 4 may be called or invoked by a user or application program independent of the functionality illustrated in FIG. 3. At 404, the invention determines if the media file is writeable. If the media file is read-only or otherwise not writeable, the invention closes the alternate stream at 412 and the open operations completes at 410. If the media file is writeable at 404 and an attempt to write the reconciled metadata to the media file is successful at 406, the invention deletes the alternate stream and the file open operation completes at 410. If the attempt to write the reconciled metadata to the media file fails at 406, the invention optionally closes the alternate stream at 414 and the open operation completes at 410. In another embodiment, the invention performs a retry later if the update fails, rather than releasing the alternate stream. The attempt to write the updated metadata to the media file at 406 may fail for various reasons including, but not limited to, the media file already being open by a third party (e.g., another user or application program), a general input/output error, or the media file may be locked.

The media file open operation illustrated in FIG. 3 and FIG. 4 is merely an exemplary embodiment of the invention. The functionality in FIG. 3 and/or FIG. 4 may be implemented independent of a file open operation.

Figure 5:
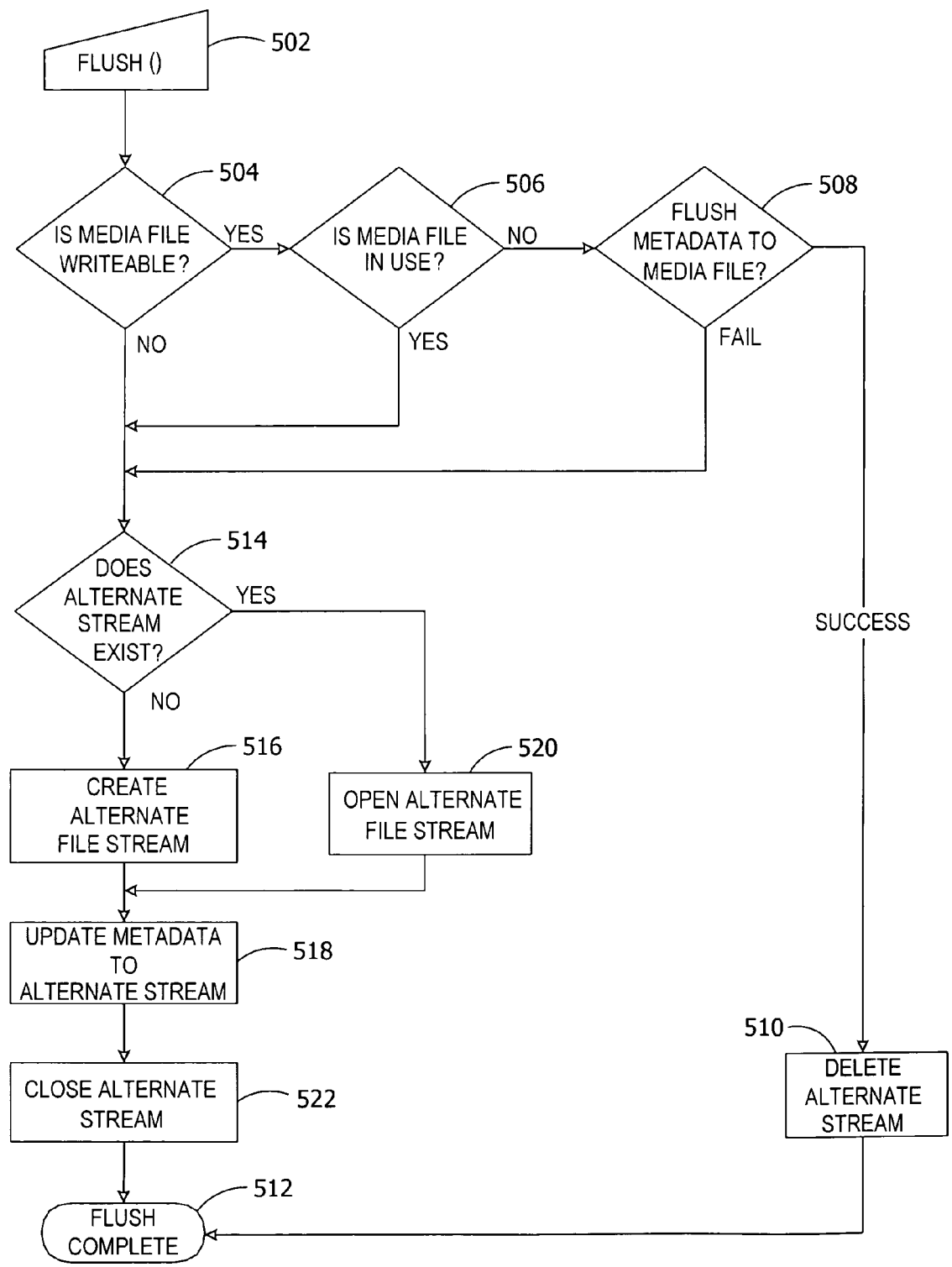
FIG. 5 is an exemplary flow chart illustrating a media file metadata flush operation.

Referring next to FIG. 5, an exemplary flow chart illustrates a media file metadata flush operation. A user or application program calls or otherwise invokes the functionality of a metadata flush operation at 502. In the flush operation, the invention determines whether the media file is writeable at 504. If the media file is writeable at 504, the invention determines whether the media file is in use at 506. If the media file is not in use at 506, the invention attempts to flush (e.g., write) the metadata to the media file at 508. If the flush is successful at 508, the invention deletes the alternate stream at 510 and the flush operation is complete at 512. If the media file is not writeable at 504 or the media file is in use at 506 or the attempt to flush the metadata to the media file at 508 fails, the invention determines if an alternate stream exists at 514. If an alternate stream exists at 514, the invention opens the alternate stream at 520. If an alternate stream does not exist at 514, the invention creates an alternate file stream at 516. After opening or creating the alternate file stream, the invention writes the reconciled metadata to the alternate stream at 518 and closes the alternate stream at 522 to complete the flush operation at 512.

The exemplary flush routine illustrated in FIG. 5 may be called by any user or application program at any time to attempt to flush the reconciled metadata to the media file.

Figure 6:
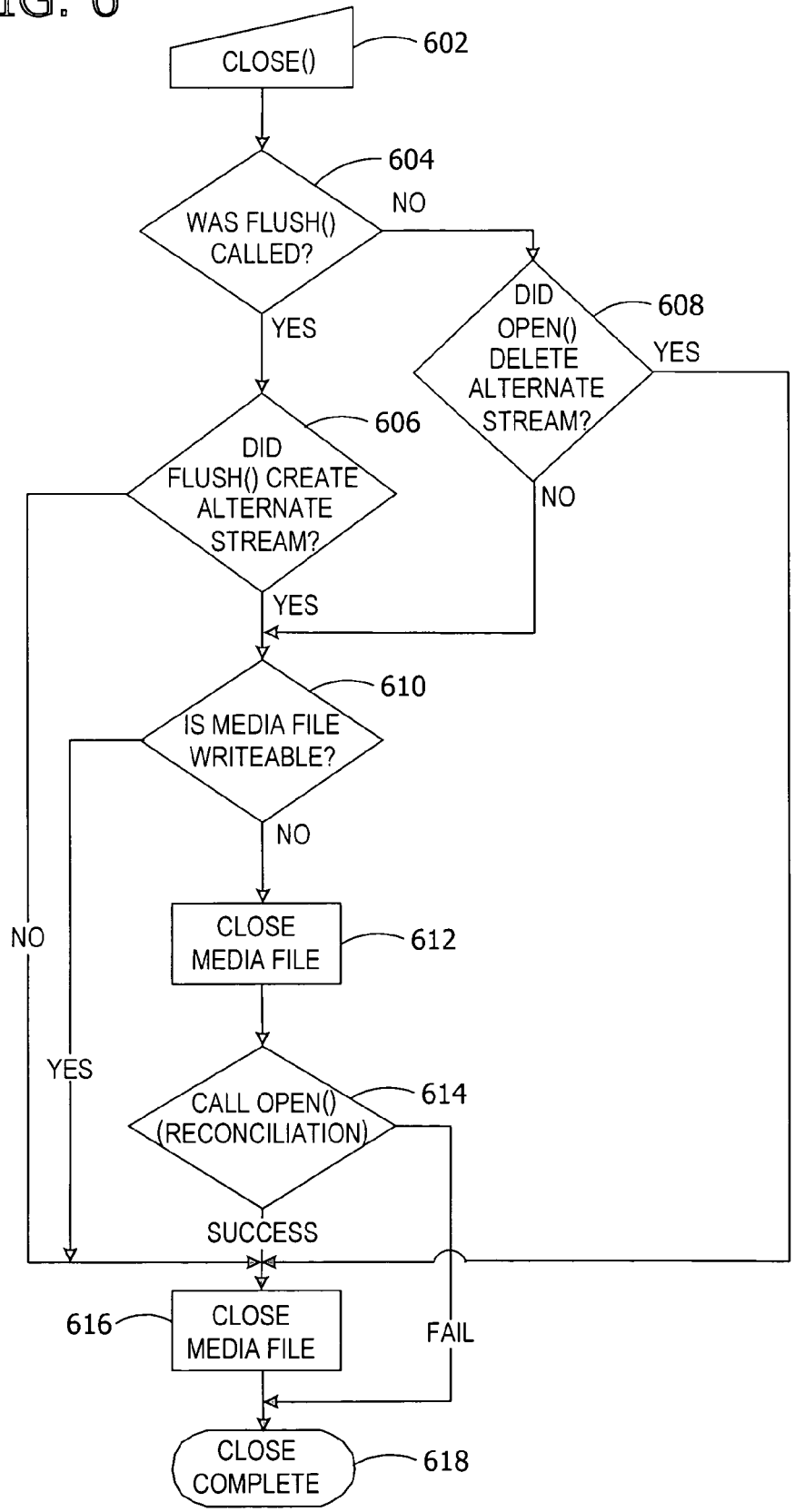
FIG. 6 is an exemplary flow chart illustrating a media file close operation.

Referring next to FIG. 6, an exemplary flow chart illustrates a media file close operation. A user or application program (e.g., a media player) calls or otherwise invokes the functionality of a close operation at 602. During the close operation, another attempt is made to reconcile any alternate stream that exists. If the media file was opened with read access only, the alternate stream would have been created when the user asked that the metadata be written to the media file. When the media file is closed, it is quickly re-opened in one embodiment with write access to have the alternate stream merged back into the media file.

In an exemplary media file close operation, the invention determines if a flush operation was previously called at 604. For example, a flush may have been attempted when an edit or update to the media file metadata occurred. If a flush operation was called at 604, the invention determines whether the flush operation created an alternate stream at 606. If the flush operation did not create an alternate stream at 606, the invention closes the media file at 616 to complete the close operation at 618. That is, the flush operation was able to write the reconciled metadata to the media file previously. If the flush operation did create an alternate stream at 606, the invention attempts to update the media file with the alternate stream at 610.

In addition, if a flush operation has not been called at 604, the invention determines at 608 whether an alternate stream was deleted when the media file was opened. If the alternate stream has been deleted at 608, the invention closes the media file at 616 to complete the media file close operation at 618. That is, the previous open operation was able to write the metadata from the alternate stream to the media file. If the open operation did not delete an alternate stream at 608, the invention attempts to update the media file with the alternate stream at 610.

At 610, the invention determines whether the media file is writeable. If the media file is writeable at 610, the invention writes the reconciled metadata to the media file and closes the media file at 616 to complete the close operation at 618. If the media file is not writeable at 610, the invention closes the media file at 612 and re-opens the media file at 614 to attempt to obtain write privileges. If the invention is able to re-open the media with write privileges at 614, the invention writes the reconciled metadata to the media file and closes the media file at 616 to complete the close operation at 618. If the invention is not able to re-open the media file with write privileges at 614, the invention ends the close operation at 618.

The state changes in FIG. 3, FIG. 4, FIG. 5, and FIG. 6 may be seconds, minutes, or hours apart. During that time, the media file or portion of the media file may be opened or locked, or conversely closed or unlocked. For example, the metadata portion of the media file may be locked for hours as a user updates the metadata.

Exemplary Operating Environment

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read-only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. Further, the functionality and structure of embodiments of the invention may be organized into any quantity of modules, components, or the like. For example, the modules may be distributed. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 2 to update metadata associated with a media file when the media file is read-only.

The following examples more clearly illustrate the invention. Computer-executable instructions (e.g., as software, hardware, or both), a file system driver, input/output driver, and an electronic device constitute exemplary means for opening the media file, exemplary means for storing updates to the metadata in the update portion of the memory area when the media file is in the read-only state, exemplary means for reconciling the metadata of the media file with the updates stored in the update portion or other memory area to create updated metadata, and exemplary means for storing the updated metadata in the media file when the media file is in the writeable state.

The exemplary media file operations illustrated in the drawings and described herein are merely exemplary. Other variations of these file operations are within the scope of the invention. Alternatively or in addition, other media file operations not described herein yet embodying metadata reconciliation according to the invention are also within the scope of the invention.

In one form, a method renders in a first data stream content stored in a media file. The media file further stores metadata describing the content. The method defines the media file to include the content and the metadata associated with the content. The media file further has a second data stream associated therewith. The method implements a file system to enable associating the second data stream with the first data stream. The second data stream stores updates to the metadata stored in the media file. The first data stream and the second data stream have at least a read-only state and a writeable state. The method includes determining if the second data stream exists and reading the metadata from the media file if the second data stream does not exist. The method further includes:

opening the second data stream into the writeable state;
reading the updates from the opened second data stream;
reading the metadata from the first data stream;
reconciling the updates read from the second data stream with the metadata read from the first data stream to create updated metadata;
attempting to write the updated metadata to the media file;
if attempting writes the updated metadata to the media file, deleting the second data stream; and
if attempting fails to write the updated metadata to the media file, writing the updated metadata to the second data stream.

The method further includes determining if an attempt value exceeds a threshold value if the second data stream fails to open into the writeable state. If the attempt value exceeds the threshold value, the method includes reading the metadata from the media file. If the threshold value exceeds the attempt value, the method includes incrementing the attempt value. The method also includes closing the media file and deleting the update data store after writing the updated metadata to the media file. If attempting to write the updated metadata to the media file fails, the method includes:

closing the media file;
re-opening the media file in the writeable state; and
re-attempting to write the updated metadata to the media file.

In one embodiment, one or more computer-readable media have computer-executable instructions for performing the exemplary methods described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A computer-implemented method for updating metadata associated with a media file, said media file having at least a read-only state and a writeable state, said computer-implemented method comprising:

opening a media file having content and metadata describing the content;
rendering the content;
receiving one or more updates to the metadata from a user; said updates comprising a rating for the rendered content;
storing the updates to the metadata in an update data store when the media file is in the read-only state, said update data store being associated with the media file;
reconciling the metadata of the media file with the updates stored in the update data store to create updated metadata; and
storing the updated metadata in the media file when the media file is in the writeable state.

2. The computer-implemented method of claim 1, wherein storing the one or more updates to the metadata comprises storing the one or more updates to the metadata in an update data store when a portion of the media file storing the metadata is in the read-only state.

3. The computer-implemented method of claim 1, further comprising:
    closing the media file when the media file is in the read-only state;
    re-opening the media file into the writeable state; and
    storing the updated metadata in the re-opened media file.

4. The computer-implemented method of claim 1, wherein opening the media file comprises opening the media file having one or more of the following as the content: audio data, video data, and still image data.

5. The computer-implemented method of claim 1, wherein the media file is capable of being in the read-only state independent of a state of the update data store.

6. The computer-implemented method of claim 1, farther comprising mapping the metadata stored in the media file to a first value and storing the first value in the update data store, and wherein reconciling the metadata of the media file with the updates stored in the update data store to create the updated metadata comprises:
    mapping the metadata stored in the media file to a second value;
    comparing the first value with the second value; and
    storing the updated metadata in the media file as a function of the compared first value and second value.

7. The computer-implemented method of claim 1, wherein one or more computer storage media have computer-executable instructions, and further comprising executing said computer-executable instructions to perform said opening, said rendering, said receiving, said storing the updates, said reconciling, and said storing the updated metadata.

8. One or more computer storage media having computer-executable components for updating metadata stored within a media file, said media file further storing content, said metadata describing the content, said media file having at least a read-only state and a writeable state, said components comprising:
    a file system module for opening the media file into the read-only state;
    a data stream module for storing, in a memory area, one or more updates to metadata when the media file is in the read-only state, said memory area being associated with the media file;
    a processor module for creating updated metadata by reconciling the metadata of the media file with the updates stored in the memory area; and
    a media module for storing the updated metadata in the media file when the media file is in the writeable state, wherein the file system module closes the media file and re-opens the media file into the writeable state, and wherein the media module further stores the updated metadata in the media file re-opened by the file system module.

9. The computer storage media of claim 8, wherein the data stream module stores, in the memory area, the one or more updates to the metadata when a portion of the media file storing the metadata is in the read-only state.

10. The computer storage media of claim 8, wherein the media file is capable of being in the writeable state independent of a state of the memory area.

11. The computer storage media of claim 8, wherein the processor module reconciles the metadata of the media file with the updates stored in the memory area by comparing a timestamp associated with the metadata of the media file with the metadata in the memory area.

12. A system for updating metadata associated with a media file, said media file having at least a read-only state and a writeable state, said system comprising:
    a memory area storing a media file having content and metadata describing the content, said memory area further storing updates to the metadata in an update portion, said update portion of the memory area being associated with the media file stored in the memory area;
    a processor configured to execute computer-executable instructions for:
        storing updates to the metadata in the update portion of the memory area when the media file is in the read-only state;
        reconciling the metadata of the media file with the updates stored in the update portion by comparing a timestamp associated with the metadata of the media with a timestamp associated with the updates stored in the update portion to create updated metadata; and
        storing the updated metadata in the media file when the media file is in the writeable state.

13. The system of claim 12, wherein the processor is further configured to execute computer-executable instructions for deleting the update portion responsive to storing the updated metadata in the media file.

14. The system of claim 12, wherein the memory area and the processor are associated with a media player.

15. The system of claim 12, further comprising means for opening the media file.

16. The system of claim 12, further comprising means for storing updates to the metadata in the update portion of the memory area when the media file is in the read-only state.

17. The system of claim 12, further comprising means for reconciling the metadata of the media file with the updates stored in the update portion to create updated metadata.

18. The system of claim 12, further comprising means for storing the updated metadata in the media file when the media file is in the writeable state.

* * * * *